United States Patent [19]

Berchem et al.

[11] 4,098,770

[45] Jul. 4, 1978

[54] SPRAY-DRIED PHENOLIC ADHESIVES

[75] Inventors: Antoine Berchem, St-Hippolyte; Krishan Kumar Sudan, Le-Corbusier; Edward Michael Gres, Weston, all of Canada

[73] Assignee: Reichhold Chemicals Limited, Islington, Canada

[21] Appl. No.: 723,250

[22] Filed: Sep. 15, 1976

[30] Foreign Application Priority Data

Sep. 30, 1975 [GB] United Kingdom ............... 39958/75

[51] Int. Cl.² .................. C08G 4/00; C08G 8/10; C08J 3/12
[52] U.S. Cl. .................. 528/130; 260/17.2; 264/13; 528/155; 528/140; 528/147
[58] Field of Search ............ 260/17.2, 58, 59 R; 264/13

[56] References Cited

U.S. PATENT DOCUMENTS

| | | | |
|---|---|---|---|
| 1,660,403 | 2/1928 | Turkington | 260/57 A |
| 2,315,432 | 3/1943 | Kropa | 260/58 |
| 2,376,213 | 5/1945 | Watson et al., | 260/58 |
| 2,976,574 | 3/1961 | Keutgen et al. | 18/48 |
| 3,661,814 | 5/1972 | Smith et al. | 260/17.2 |

*Primary Examiner*—Harold D. Anderson
*Assistant Examiner*—E. A. Nielsen
*Attorney, Agent, or Firm*—Smart & Biggar

[57] ABSTRACT

A method of preparing a modified phenol-formaldehyde resin in solid particulate form comprising reacting together, in an aqueous medium, phenol and formaldehyde, in a ratio of 1.0 mole phenol to between 1.8 and 3.5 moles of formaldehyde, in the presence of between 0.1 and 1.0 moles of a basic catalyst; continuing this reaction until a desired viscosity is reached; modifying the reaction system by adding thereto between 0 and 30%, based on the weight of phenol originally taken of a non-phenolic polyhydroxy compound; spray drying the thus modified liquid resin in a pressure nozzle drier, and chilling the spray dried particulate solid. These solid resins are redispersible in water and stable on storage, compared to the known aqueous, equivalent, systems.

24 Claims, No Drawings

SPRAY-DRIED PHENOLIC ADHESIVES

BACKGROUND OF THE INVENTION

Base-catalysed phenolic adhesives are usually prepared in a liquid form, the most common solvent being water. The solubility and dilutability of the product are determined by several factors, the most important being the catalyst used, the phenol to aldehyde molar ratio used, and the amount of catalyst used. But this basic reaction whereby the resin is prepared, although carried out at an elevated temperature, generally 50° to 100° C, never stops, and continues in the solution on storage, albeit at a slow rate. This lack of stability severely limits product usefulness, as dilutability and viscosity are adversely affected by storage. As a consequence, these aqueous systems have to be prepared close to where they are to be used, and ideally are prepared and used at the same rate, with minimal storage times. Also, where some transportation cannot be avoided, since the system contains of the order of 50% water, transportation is costly, particularly in comparison with the known solid resins. Further, the high water content of liquid resins is undesirable in applications where prolonged heat application to effect its removal is required. In addition to the cost, such prolonged heating can adversely affect the material being bonded, with detriment to the properties of the product.

SUMMARY OF THE INVENTION

We have now found that a range of phenol-aldehyde resins, hitherto known only as aqueous solutions or dispersions, can be obtained as a particulate solid by spray-drying such an aqueous suspension or solution. We have further found that the capability of such resin solutions or dispersions being processable to a particulate solid by spray drying is markedly enhanced by the incorporation therein of a non-phenolic polyhydroxy compound.

Thus in one embodiment this invention provides a method of preparing a phenol-formaldehyde resin in solid particulate form comprising reacting together, in an aqueous medium, phenol and formaldehyde, in a ratio of 1.0 mole phenol to between 1.8 and 3.5 moles of formaldehyde, in the presence of between 0.1 and 1.0 mole of a basic catalyst; continuing this reaction until a desired viscosity is reached; spray drying the solution or dispersion of phenol-formaldehyde resin thus produced in a pressure nozzle drier; and chilling the spray dried particulate solid so produced for storage.

In a preferred embodiment this invention provides a method of preparing a phenol-formaldehyde resin in solid particulate form comprising reacting together, in an aqueous medium, phenol and formaldehyde, in a ratio of 1.0 mole of phenol to between 1.8 and 3.5 moles of formaldehyde in the presence of between 0.1 and 1.0 moles of a basic catalyst; continuing this reaction until a desired viscosity is reached; modifying the reaction system by adding thereto between 0 and 30%, based on the weight of the phenol originally taken, of a non-phenolic polyhydroxy compound; spray drying the thus modified liquid resin in a pressure nozzle drier; and chilling the spray dried particulate solid for storage.

In an alternative process according to this embodiment of the invention, the non-phenolic polyhydroxy compound is incorporated at up to 30% by weight of phenol into the initial reaction mixture.

DETAILED DESCRIPTION OF THE INVENTION

Insofar as the conditions of reaction, and reactants used in preparing the phenol-formaldehyde resin are concerned, standard conditions, procedures, and reactants well known in the art are used.

The term "phenol" can include not only pure and technical grade phenol, but also cresols with a high meta- or para-cresol content. The preferred phenol composition is one with a boiling range of 180°-200° C, containing not more than 15% by weight of orthocresol plus xylenols.

The formaldehyde, can be used in any of the commercially available forms containing from 37 to 100% aldehyde, such as aqueous solutions, paraformaldehyde, etc. An aqueous solution of formaldehyde is preferred.

The basic catalyst can be an alkali hydroxide, or carbonate, or an alkaline earth oxide or hydroxide. The preferred catalyst is sodium hydroxide, but barium hydroxide, calcium hydroxide and calcium oxide all produce usable resins.

The non-phenolic polyhydroxy compound can be chosen from glycols, such as ethylene glycol, propylene glycol, butylene glycol, and diethylene glycol; polyhydroxy ethers, such as the Voranols*, and other polymeric hydroxy materials, for example the Carbowaxes*; and polyhydroxy compounds such as glycerol, sorbitol, cane sugar, etc. It is also contemplated that mixtures of polyhydroxy compounds can also be used.
*Trade Mark To obtain a useful adhesive resin suitable for spray drying, the molar ratios of phenol, formaldehyde, and catalyst have to be controlled and kept within the following limits: phenol, 1.0 mole; formaldehyde, 1.8 to 3.5 moles; catalyst, 0.1 to 1.0 moles. The amount of polyhydroxy compound also should not exceed 30% by weight of the weight of phenol taken.

In an alternative embodiment, this invention provides a spray-dried particulate solid phenol-formaldehyde resin, containing up to 30% by weight of the phenol present of a polyhydroxy compound.

Preferably the spray drying step is carried out on the liquid resin dissolved or dispersed in water using a pressure nozzle drier. It is desirable to chill the spray dried particles quickly to below 20° C for storage.

The nature of the product can be further modified for use by the introduction of other materials, such as dyes; extenders and fillers; plasticisers; anti-static agents; release agents; and so forth.

The spray dried phenolic adhesives of this invention have a number of advantages, especially where systems which it has not hitherto been possible to convert into solid form are concerned. The spray dried material is an easily handled, free flowing powder, which can be used as such, or, where relevant reconstituted to a liquid system by the addition of the desired amount of water. Particular advantages obtained by use of these solids are:

(a) the solid systems do not suffer from the lack of stability exhibited by liquid systems; they can be stored if kept dry and preferably below about 70° to 75° F (21° to 24° C) for at least 6 months, as compared to their liquid counterparts which have only a limited shelf-life.

(b) where relevant, reconstitution to a liquid resin with retention of desirable viscosity and dilutability characteristics.

(c) shorter pressing times and lower pressing temperatures when spray-dried adhesive is used in place of liquid adhesive in manufacture of waferboard, chipboard and the like, thus maintaining short cure cycles and minimising damage to the furnish.

(d) better economics of storage and transportation as the 50% water content of a liquid resin is removed.

(e) better utilization of resin, since the loss of relatively low molecular weight components, which generally are lost in, for example, the white water in board making, is virtually eliminated; this has the consequence that pollution problems associated with white water treatment are also alleviated.

(f) improved economics of production involving shorter batch processing times, and powder production without grinding.

Spray drying is an operation in which a liquid feed is converted to a fine spray, the moisture in the feed evaporated by means of a stream of hot gas (usually air) and the dry powdered product then separated from the gas. The process can be applied to solutions, emulsions or slurries or any material that can be pumped. Moisture evaporation, both free and chemically bound, is controlled by temperature and moisture gradients in the material during drying. The ease of drying of materials depends on the temperature difference between inlet and outlet drying air—the greater permissible difference, the easier the drying.

Spray dried particles are usually spherical; solutions produce hollow beads while slurries produce solid beads. The particle size varies with degree of atomization and percent solids in the feed. Other characteristics of the dried material such as moisture content, flowability, etc. are controlled by operational variables such as droplet size, air flow rate, air temperature and humidity.

Phenol-formaldehyde resins fall into a class of materials that have low softening points. During drying, the tacky particles have to be chilled down below softening point in the layer of cool air and thus be prevented from sticking to surfaces. Generally used temperatures for drying phenol-formaldehyde resins are 210°–180° C at the inlet and 90°–100° C at the outlet.

In the Examples, the following test procedures are used to obtain the cited test results.

A. MELT POINT, FLOW AND CURE OF REACTIVE PHENOLICS

Softening Point—Capillary Method

A capillary sealed at one end is filled with powdered material to a depth of 2 cm. The tube is attached to a thermometer so that the resin is next to the bulb and the thermometer is immersed in a clear bath heated at 3° C/min. The softening point is recorded as the point at which the resin first contracts away from the side of the capillary tube.

Inclined Glass Plate Flow Test

A pressed pellet of the resin (0.5 g) is placed at one end of glass plate kept in horizontal position at 125° C in convection oven. After 3 min. preheat time, the plate is tilted 65° from horizontal and testing continued for additional 20 minutes. The glass plate is removed from the oven, cooled and the length of the flow is measured in millimeters and recorded.

Hot Plate Cure

Powdered resin (1 g) is spread over 2-inch square area on a hot plate maintained at 150° C. Timing is started and the resin is stroked and patted alternately. As the resin advances and becomes more viscous, it will 'string' from spatula during patting. The point in time at which the resin no longer sticks to the spatula and the spatula lifts clear is recorded as the cure time.

B. MODULUS OF RUPTURE (ASTM D1037)

Modulus of rupture (MOR), a static bending test, is carried out using a suitable testing machine (E4) on preconditioned or soaked specimens cut along the two dimensions of the board and measuring 3 × 6 inches for boards over ¼-inch thick. The specimens are subjected to load application at mid span with supports being 4 inches apart at a uniform rate of load increase.

Modulus of rupture is reported in pounds per square inch calculated from $$MOR = \frac{3 \times \text{maximum load} \times \text{span}}{2 \times \text{width of spec.} \times (\text{thickness})^2}$$

C. INTERNAL BOND (ASTM D1037)

Internal bond strength (IB) or tensile strength perpendicular to the surface is determined by testing preconditioned 2 × 2 inch specimens.

The specimens are bonded to the loading blocks which are engaged in heads of the testing machine. The specimens are subjected to stress to failure with the load passing through the center of the specimens in a continuous fashion at a uniform rate.

Internal bond strength is calculated from the maximum load at failure per square inch. The location of the line of failure is also reported.

D. VISCOSITY

Viscosity measured by means of a Gardner-Hold Viscosity Comparator, to stated letter viscosity.

EXAMPLES

Example 1

RESIN A L

| Phenol | 1 mole |
| --- | --- |
| Formaldehyde (44% Sol.) | 2 moles |
| Sodium Hydroxide (50% Sol.) | .65 mole |
| Water | To make up 45% N.V. |

Phenol, formaldehyde, water and ⅓ amount of base required were heated under reflux with agitation to 60° and held at 60° C with cooling for 30 minutes. The balance of sodium hydroxide was added and the mixture held at 80° C to viscosity D. The resin was cooled rapidly for storage.

Example 2

RESIN A S

The above liquid resin was spray dried at 45% solids to give a free flowing powder with no flow or cure but infinite solubility in water.

Example 3

HARDBOARD FROM RESINS AL, AS

Resin A S was reconstituted with water to 45% solids and then diluted further to 8% solids. The dilute resin solution was sprayed into a wood furnish slurry buffered at pH 4.5 at 2% resin level. The slurry was drained and the mat pressed at 350° F for 6 min. to form hardboard.

Hardboard was also prepared with original liquid resin AL.

Physical testing:
AL IB 34 psi
AS IB 38 psi

Example 4
RESIN B L

| Phenol | 1 mole |
|---|---|
| Formaldehyde (37% Sol.) | 2 mole |
| Sodium Hydroxide (50% Sol.) | 0.83 mole |
| Water | to make 45% N.V. |

Phenol, formaldehyde, (½ of requirement) water and sodium hydroxide (56% of requirement) were heated under reflux with agitation to 100° C and held at the temperature until viscosity T was reached. The mixture was cooled to 60° C and formaldehyde (balance) was added and the mixture held at 75° until viscosity X was reached. The mixture was cooled to 50° C and the balance of sodium hydroxide was added and the resin held at 60° C for viscosity O. The resin was cooled rapidly for storage.

Example 5
RESIN B S

The above liquid resin was spray dried at 45% solids to a free flowing powder with no flow or cure but fully soluble in water.

Example 6
PLYWOOD FROM RESIN B S

Resin B S was reconstituted with water to 45% solids and formulated into plywood adhesive using the following formulation:

| Resin | 200 parts |
|---|---|
| Water | 60 parts |
| Norprofil | 30 parts |
| Wheat flour | 6 parts |
| Soda Ash | 6 parts |

Exterior grade plywood was prepared using the above mix as adhesive at 58 lb/1000 sq. ft. double glue-line at 300° F, 200 psi for ⅜-inch thick, 3 ply, at 4.75 mins. press time for two panels per opening. This was compared with the product obtained with original liquid resin as adhesive. The speed of cure was compared for BL and BS resins, using wood failure test as specified by ASTM.

|  |  | Press time, min. | | |
|---|---|---|---|---|
|  |  | 4.75 | 5.25 | 6.25 |
| BL | Wood Failure % | 49 | 68 | 74 |
| BS | Wood Failure % | 23 | 64 | 98 |

Example 7
RESIN C L

| Phenol | 1 mole |
|---|---|
| Propylene Glycol | 0.5 mole |
| Formaldehyde (44% Sol.) | 1.9 mole |
| Sodium Hydroxide (50% Sol.) | 0.18 mole |
| Water | To make up 45% N.V. |

Phenol, propylene glycol, water, formaldehyde (90% of requirement) and sodium hydroxide (50% of requirement) was held with agitation at 50° C for 30 minutes. Formaldehyde (balance of requirement) and sodium hydroxide (25% of requirement) was added and the mixture heated to 75° C and held at that temperature for 30 minutes. Balance of sodium hydroxide was added and the reaction mixture held at 75° C for viscosity H. Resin was cooled rapidly for storage.

Example 8
RESIN C S 1

The resin C L was spray dried to a find powder which had limited solubility in water and cure of 0–10 sec.

Example 9
RESIN C S 2

The resin CL was treated with propylene glycol (6% approx. on phenol used initially) and spray dried, to a fine powder with cure of 10–30 sec. and solubility in water.

Example 10
WAFERBOARD FROM RESIN C S 2

Preparation and Results: 7/16-inch Board prepared at 3% resin content. pressed at 410° F for 4 minutes had IB 44.5 and MOR 3360.

Moulding compound from C S 2

A moulding compound was prepared using the above resin by processing the following mix:

| Resin | 100 parts |
|---|---|
| Line | 2 parts |
| Carbon Black | 4 parts |
| Calcium Stearate | 1 part |
| Wood flour | 106 parts |
| Asbestos | 4 parts |
| Furfural | 1.5 parts |

A compound with 50 sec. cure and 8 sec. flow at 150 psi was obtained.

Example 11
RESIN D L

| Phenol | 1 mole |
|---|---|
| Formaldehyde (44% Sol.) | 2.2 mole |
| Barium Hydroxide | 4% on phenol |
| Sodium Hydroxide (50% Sol.) | .7 mole |
| Water | To make up 45% N.V. |

Phenol, formaldehyde, water and barium hydroxide (1/5 of the requirement) were heated to 50° with agitation and held at that temperature for 30 minutes. More barium hydroxide (2/5 of requirement) was added and the mixture held at 60° C for 30 minutes. The balance of barium hydroxide was then added and the mixture held at 80° C for 30 minutes. Sodium hydroxide was next added in two portions and the resin held at 90° for viscosity G. The resin was cooled rapidly for storage.

Example 12
RESIN D S

The above liquid resin was spray dried into a fine powder, possessing flow and cure (0–10 sec.) and infinite solubility in water.

Example 13
WAFERBOARD FROM RESIN D S

Preparation and results: 7/16-inch Boards prepared from 3% solid resin at 400° F for 5 minutes had IB 45.0 and MOR 2615.

Example 14
RESIN E L

| | |
|---|---|
| Phenol | 1 mole |
| Formaldehyde (44% Sol.) | 2.2 mole |
| Calcium Oxide | 5% |
| Sodium Hydroxide (50% Sol.) | .42 mole |
| Water | to make up 45% N.V. |

Example 15
RESIN FS

The above resin was treated with propylene glycol (8% approx. on phenol taken initially) and spray dried to a free flowing powder with flow and cure (25–35 sec.) possessing solubility in water.

Example 16
WAFERBOARD FROM RESIN FS

5/16-inch Board prepared with the resin (3% powder) at 400° F and 4 minutes press had IB 55.5 and MOR 2682.

Example 17
RESIN G L

| | |
|---|---|
| Cresol | .15 mole |
| Phenol | 1.0 mole |
| Propylene Glycol | .3 mole |
| Formaldehyde 44% Sol. | 2.3 mole |
| Water | enough to make up 45% N.V. |
| Sodium hydroxide 50% Sol. | .17 mole |

Cresol, phenol, propylene glycol, formaldehyde 90% of requirement and water was loaded heated at 40° with ⅝ of the sodium hydroxide requirement. The mixture was held at 60° C for 30 minutes. The remainder of formaldehyde and sodium hydroxide was added and the mixture held at 85° for viscosity F. The resin was cooled down for storage.

Example 18
RESIN GS

The above resin was spray dried (215°–105°) to give a product with cure of 15 sec.

Example 19
WAFERBOARD FROM RESIN GS

Waferboard (5/16-inch) prepared from the G S resin at press temperature of 410° F, 400 psi and 4 minute press cycle had IB of 44.2, MOR 2420.

Example 20
RESIN E S

Resin E L was prepared following the procedure described under Resin DL, and was treated with ethylene glycol (12% approx. on phenol taken initially) and spray dried into free flowing powder with flow and cure (15–30 sec.) possessing solubility in water.

Example 21
WAFERBOARD FROM RESIN E S

Preparation and Results: 7/16-inch Boards prepared with 3% resin (powder) at 400° F and 3.5 minutes press had IB 28.5 and MOR of 2420.

Example 22
RESIN F L

| | |
|---|---|
| Phenol | 1 mole |
| Formaldehyde (44% Sol.) | 2.0 mole |
| Calcium Hydroxide | 1% on phenol |
| Sodium Hydroxide (50% Sol.) | .32 mole |
| Water | To make up 45% N.V. |

The resin was prepared by heating phenol, formaldehyde (85% of requirement), water and calcium hydroxide (1/5 of requirement) at 50° C for 30 minutes and then adding the remainder of the catalyst in two portions and holding the mixture at 60° and 80° C respectively for 30 minutes after each addition. Balance of formaldehyde and sodium hydroxide were added and the mixture held at 80° C for viscosity D. The resin was cooled rapidly for storage.

Example 23
RESIN FS

The above resin was treated with butylene glycol (6% approx. on phenol taken initially) and spray dried to a free flowing powder, with flow and cure (25–35 sec.) and solubility in water.

Example 24
WAFERBOARD FROM RESIN FS

Board prepared using the resin (3% powder) at 400° F and 3½ minutes press had IB 95.5 and MOR 2908.

What is claimed as our invention is:

1. A method of preparing a phenol-formaldehyde resin in particulate form comprising reacting together, in an aqueous medium, phenol and formaldehyde, in a ratio of 1.0 mole phenol to between 1.8 and 3.5 moles formaldehyde, in the presence of between 0.1 and 1.0 mole of a basic catalyst; continuing this reaction until a desired viscosity is reached; spray-drying the solution or dispersion of phenol-formaldehyde resin thus produced through a pressure nozzle into a heated gas; and chilling the spray dried particulate solid.

2. A method of preparing a modified phenol-formaldehyde resin in solid particulate form comprising reacting together, in an aqueous medium, phenol and formaldehyde in a mole ratio of 1.0 mole phenol to between 1.8 and 3.5 moles of formaldehyde, in the presence of between 0.1 and 1.0 moles of a basic catalyst; continuing this reaction until a desired viscosity is reached; modifying the reaction system by adding thereto between 0% and 30%, based on the weight of phenol originally taken, of a non-phenolic polyhydroxy compound; spray drying the thus-modified solution or dispersion of phenol-formaldehyde resin produced through a pressure nozzle into a heated gas; and chilling the spray dried particulate solid.

3. Process according to claim 2, wherein the polyhydroxy compound is added to the reaction system after the desired viscosity is reached and before spray drying thereof.

4. Process according to claim 2 wherein the polyhydroxy compound is incorporated into the initial reaction mixture.

5. Process according to claim 1, wherein pure or technical grade phenol is used.

6. Process according to claim 1, wherein the phenol is replaced at least in part by a cresol mixture having a high meta- and para-cresol content.

7. Process according to claim 1 wherein a technical grade phenol is used, having a boiling range of 180° to 200° C and containing not more than 15% by weight of ortho-cresol plus xylenols.

8. Process according to claim 1 wherein an aqueous solution of formaldehyde is used.

9. Process according to claim 2, wherein pure or technical grade phenol is used.

10. Process according to claim 2, wherein the phenol is replaced at least in part by a cresol mixture having a high meta- and para-cresol content.

11. Process according to claim 2 wherein a technical grade phenol is used, having a boiling range of 180° to 200° C and containing not more than 15% by weight of ortho-cresol plus xylenols.

12. Process according to claim 2 wherein an aqueous solution of formaldehyde is used.

13. Process according to claim 2, wherein the polyhydroxy compound is chosen from glycols, polyhydroxy ethers, polyhydric alcohols, sugars, and polymeric hydroxyl groups containing substances.

14. Process according to claim 13, wherein the polyhydroxy compound is chosen from ethylene glycol, propylene glycol, and butylene glycol.

15. A product of the process of claim 1 which is a particulate solid phenol-formaldehyde resin obtained by spray drying an aqueous solution or dispersion obtained by reacting together phenol and formaldehyde in a ratio of 1.0 mole phenol to between 1.8 and 3.5 moles of formaldehyde in the presence of from 0.1 to 1.0 mole of a basic catalyst.

16. A product of the process of claim 2 which is a particulate solid phenol-formaldehyde resin obtained by spray drying an aqueous solution or dispersion obtained by reacting together phenol and formaldehyde in a ratio of 1.0 mole phenol to between 1.8 and 3.5 moles of formaldehyde in the presence of from 0.1 to 1.0 mole of a basic catalyst, also containing between 0 and 30%, based on the weight of phenol originally taken, of a non-phenolic polyhydroxy compound.

17. A product according to claim 15 prepared from pure or technical grade phenol.

18. A product according to claim 16 prepared from pure or technical grade phenol.

19. A product according to claim 15 prepared from a phenols mixture, in which at least part of the phenol is replaced by a cresol mixture having a high meta- and para-cresol content.

20. A product according to claim 16 prepared from a phenols mixture, in which at least part of the phenol is replaced by a cresol mixture having a high meta- and para-cresol content.

21. A product according to claim 15 prepared from a technical grade phenol, having a boiling range of 180° to 200° C, and containing not more than 15% by weight of ortho-cresol plus xylenols.

22. A product according to claim 16 prepared from a technical grade phenol, having a boiling range of 180° to 200° C, and containing not more than 15% by weight of ortho-cresol plus xylenols.

23. A product according to claim 16, in which the non-phenolic polyhydroxy compound is chosen from glycols, polyhydroxy ethers, polyhydric alcohols, sugars, and polymeric hydroxyl group containing substances.

24. A product according to claim 16, in which the non-phenolic polyhydroxy compound is chosen from ethylene glycol, propylene glycol, and butylene glycol.

* * * * *

Disclaimer and Dedication

4,098,770.—*Antoine Berchem,* St-Hippolyte; *Krishan Kumar Sudan,* Le-Corbusier, and *Edward Michael Gres,* Weston, Canada. SPRAY-DRIED PHENOLIC ADHESIVES. Patent dated July 4, 1978. Disclaimer and Dedication filed May 7, 1982, by the assignee, *Reichhold Ltd.*

Hereby disclaims and dedicates to the Public the entire term of said patent.
[*Official Gazette June 29, 1982.*]